(12) United States Patent
Araki

(10) Patent No.: US 9,427,925 B2
(45) Date of Patent: Aug. 30, 2016

(54) TIRE MANUFACTURING APPARATUS AND TIRE MANUFACTURING METHOD

(75) Inventor: Yusuke Araki, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 784 days.

(21) Appl. No.: 13/702,452

(22) PCT Filed: Dec. 3, 2010

(86) PCT No.: PCT/JP2010/071648
§ 371 (c)(1),
(2), (4) Date: Feb. 13, 2013

(87) PCT Pub. No.: WO2011/155087
PCT Pub. Date: Dec. 15, 2011

(65) Prior Publication Data
US 2013/0139957 A1   Jun. 6, 2013

(30) Foreign Application Priority Data
Jun. 10, 2010   (JP) .................. 2010-133024

(51) Int. Cl.
*B29D 30/58* (2006.01)
*B29D 30/08* (2006.01)
*B29D 30/26* (2006.01)
*B29D 30/52* (2006.01)

(52) U.S. Cl.
CPC ........... *B29D 30/08* (2013.01); *B29D 30/2607* (2013.01); *B29D 30/58* (2013.01); *B29D 2030/523* (2013.01); *B29D 2030/585* (2013.01)

(58) Field of Classification Search
CPC .. B29D 30/2607; B29D 30/54; B29D 30/56; B29D 30/58; B29D 2030/0038; B29D 2030/523; B29D 2030/543; B29D 2030/585

USPC ...................... 156/96, 126, 127, 406.2, 421.8
See application file for complete search history.

(56) References Cited

U.S. PATENT DOCUMENTS 2,936,813 A * 5/1960 Haase ................ B29D 30/3014
156/126
3,676,262 A * 7/1972 Leblond ............. B29D 30/2607
156/417

(Continued)

FOREIGN PATENT DOCUMENTS

EP     0 071 838 A1    7/1982
EP     1 491 324 A2   12/2004

(Continued)

OTHER PUBLICATIONS

International Search Report for PCT/JP2010/071648 dated Mar. 8, 2011.

(Continued)

*Primary Examiner* — Geoffrey L Knable
(74) *Attorney, Agent, or Firm* — Sughrue Mion, PLLC

(57) ABSTRACT

A tire manufacturing apparatus and a tire manufacturing method capable of efficiently manufacturing quality tire by uniformly expanding the diameter of an annular tread and mounting the tread on a base tire without axial deviation. The tire manufacturing apparatus for mounting an annular tread on the outer periphery of a base tire includes a drum for securing a base tire, a plurality of holding means each having a holding surface for holding the outer periphery of the annular tread, a moving means for moving the holding means along the central axis of the base tire, a sealing means for sealing the opening on one side of the annular tread, and an air supplying means for supplying air into a space surrounded by the annular tread and the sealing means.

2 Claims, 10 Drawing Sheets

(56) References Cited

U.S. PATENT DOCUMENTS

| | | |
|---|---|---|
| 4,036,677 A | 7/1977 | Marangoni |
| 4,178,198 A | 12/1979 | Kent |
| 5,380,383 A | 1/1995 | Chlebina et al. |
| 5,486,260 A | 1/1996 | Garmy et al. |
| 6,521,071 B2 | 2/2003 | Parrish et al. |

FOREIGN PATENT DOCUMENTS

| | | |
|---|---|---|
| EP | 1 547 758 A2 | 6/2005 |
| JP | 53-102981 A | 9/1978 |
| JP | 7-276934 A | 10/1995 |
| JP | 3633956 B2 | 3/2005 |

OTHER PUBLICATIONS

International Preliminary Report on Patentability for International Patent Application No. PCT/JP2010/071648 mailed Jan. 24, 2013.

Extended European Search Report, dated Nov. 6, 2013, issued in corresponding European Patent Application No. 10852922.3.

Communication dated Nov. 25, 2015, issued by the European Patent Office in corresponding European Application No. 10 852 922.3.

* cited by examiner

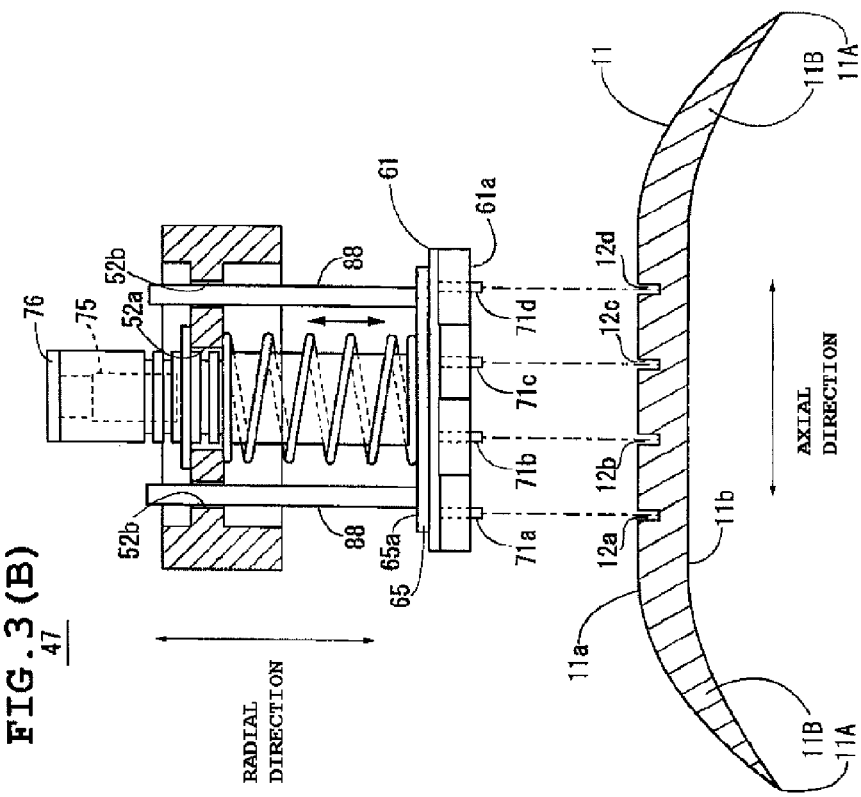
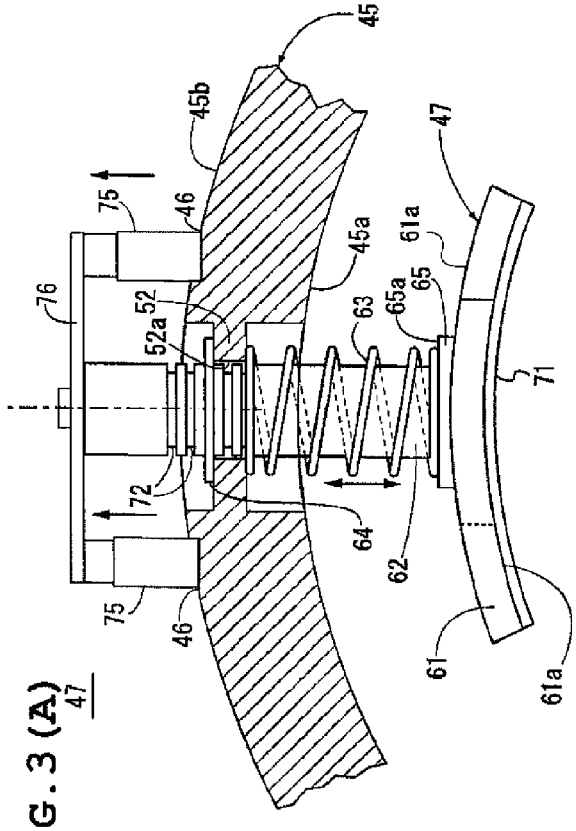
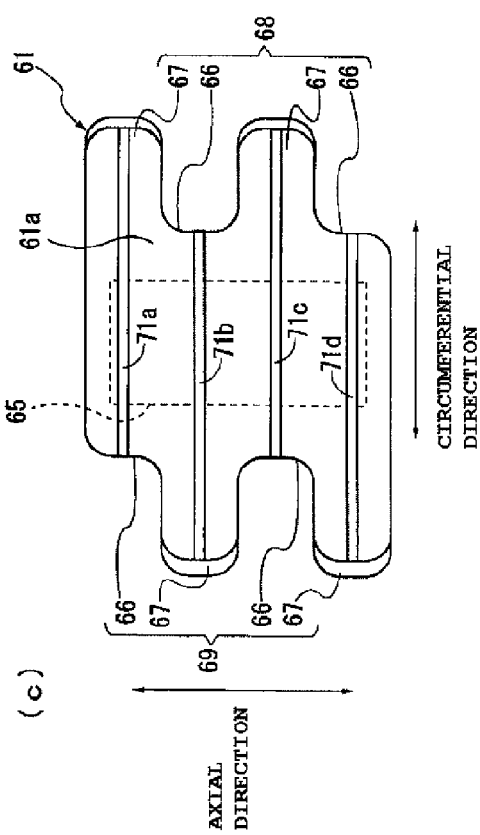

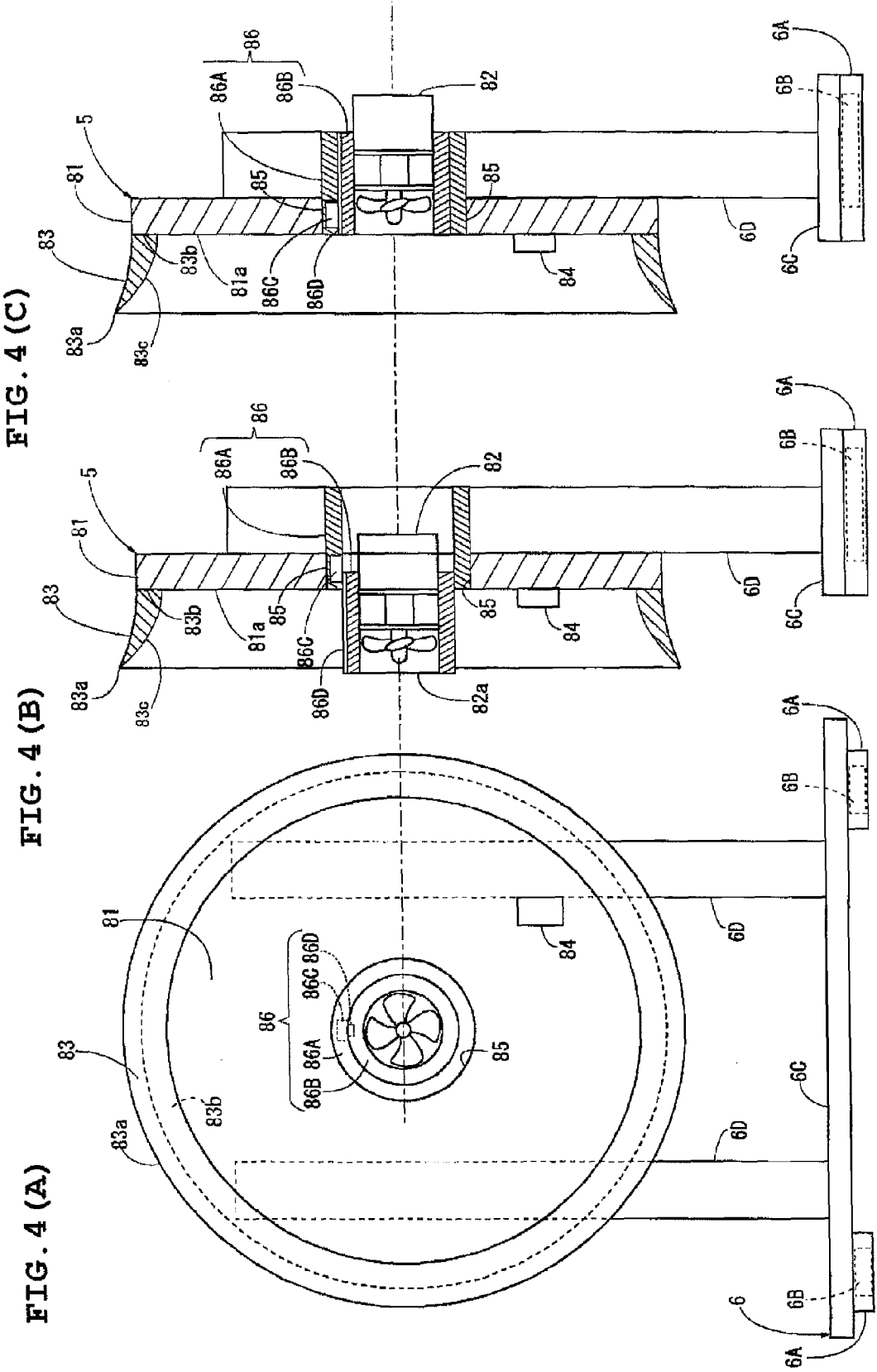

TIRE MANUFACTURING APPARATUS AND TIRE MANUFACTURING METHOD

CROSS REFERENCE TO RELATED APPLICATIONS

This application is a National Stage of International Application No. PCT/JP2010/071648, filed on Dec. 3, 2010, which claims priority from Japanese Patent Application No. 2010-133024, filed on Jun. 10, 2010, the contents of all of which are incorporated herein by reference in their entirety.

TECHNICAL FIELD

The present invention relates to a tire manufacturing apparatus and a tire manufacturing method and, in particular, to a tire manufacturing apparatus and a tire manufacturing method for mounting a tread, which has been formed into an annular shape in advance, on a base tire.

BACKGROUND ART

In a conventionally known method for manufacturing a tire, a base tire, which is the base of a tire, and an annular tread, which serves as the tread of the tire, are built separately. Then the tread is mounted on the base tire by a tire manufacturing apparatus.

For example, such a tire manufacturing apparatus is comprised of a base tire holding unit for holding a base tire, a tread holding unit for expandably and contractably holding a tread, a moving means for moving the tread holding unit toward and back from the base tire holding unit, and a pressing means for pressing the tread onto the outer periphery of the base tire when fitting the tread on the base tire.

On the above-mentioned tire manufacturing apparatus, a base tire, with air filled in it, is secured rotatably to the drum of the apparatus. Also, its tread holding unit has an expansion/contraction mechanism capable of synchronously expanding radially a plurality of annularly arranged bar members, each bar member having a plurality of rollers in the extension direction. And the tread is held with its inner periphery riding the bar members of the expansion mechanism. Then the tread is radially expanded wider than the outside diameter of the base tire as the bar members holding the tread are moved radially outward. And the tread, together with the tread holding unit, is moved to a position where the inner periphery of the tread is in a predetermined position relative to the outer periphery of the base tire. When the tread is located in the predetermined position relative to the base tire, the bar members are moved radially inward until they come into contact with the outer periphery of the base tire. Then as the tread is pressed to the base tire, with the pressing means of the tread holding unit pressing the outer periphery of the tread, the plurality of bar members are pulled out from between the tread and the base tire. Thus the tread and the base tire are fitted together into a single body.

However, the above-described tire manufacturing apparatus is of such structure that the tread is held and spread radially wider by a plurality of bar members. Hence, there result differences in expansion between the parts of the tread where they are held by the bar members and the other parts thereof where they are not. It is therefore possible that the diameter of the tread is not expanded uniformly along the circumference.

Also, when the tread is mounted on the base tire, the bar members are pulled out as the tread is pressed to the base tire with the pressing means. Therefore, it is possible that the areas of the tread other than the parts where they are pressed by the pressing means are fitted on the base tire with some deviation (position gap) in the axial direction of the tire. This may hamper the improvement of productivity by manufacturing quality tires efficiently.

PRIOR ART DOCUMENT

Patent Document

Patent Document 1: Japanese Unexamined Patent Application Publication No. 53-102981
Patent Document 2: U.S. Pat. No. 4,036,677
Patent Document 3: U.S. Pat. No. 6,521,071 B2

SUMMARY OF THE INVENTION

Problem to be Solved by the Invention

The present invention has been made to solve the foregoing problems, and an object thereof is to provide a tire manufacturing apparatus and a tire manufacturing method capable of manufacturing quality tire with efficiency by expanding the diameter of an annular tread uniformly along the circumference and mounting the tread on the base tire without axial deviation of the tread from the base tire.

A first aspect of the invention provides a tire manufacturing apparatus for mounting an annular tread on the outer periphery of a base tire. The apparatus is comprised of a drum for securing a base tire, a holding means having holding surfaces for holding the outer periphery of the annular tread, a moving means for moving the holding means along the central axis of the base tire, a sealing means for sealing an opening on one side of the annular tread, and an air supplying means for supplying air into a space surrounded by the annular tread and the sealing means.

According to this aspect, the pressure in the space surrounded by the annular tread and the sealing unit is raised by the air supplied by the air supplying means. As a result, the inner peripheral surface of the annular tread is pushed by the air, thereby uniformly expanding the diameter of the annular tread along its circumference. Thus, while the raised pressure in the space surrounded by the annular tread and the sealing unit is maintained, the annular tread can be so placed relative to the outer peripheral surface of the base tire that the axial center of the annular tread is aligned with the axial center of the base tire. Then, with the pressure in the space lowered, the annular tread can be mounted on the base tire without any position gap.

A second aspect of the invention provides a tire manufacturing apparatus, in which the sealing unit has an annular sealing member that comes into contact with an outer peripheral surface of the annular tread.

According to this aspect, when air is supplied by the air supplying means, the edge portion of the annular tread is expanded radially outward. Thus the outer peripheral surface of the annular tread is pushed against the sealing member, thereby accomplishing an excellent sealing.

A third aspect of the invention provides a tire manufacturing apparatus, in which each of the holding surfaces has projections corresponding to circumferential grooves in the annular tread.

According to this aspect, with the projections on each of the holding surfaces fitted into the circumferential grooves in the annular tread, the annular tread can be set on the plurality of holding means in a constantly positioned state relative to the plurality of holding means. Further, this will prevent the annular tread from axially deviating from the base tire when air is supplied by the air supplying means. Thus the annular tread can be mounted on the base tire with accuracy.

A fourth aspect of the invention provides a tire manufacturing method for mounting an annular tread on the outer periphery of a base tire, which includes the steps of placing the outer periphery of the annular tread on a plurality of holding means, sealing the opening on one side of the annular tread with a sealing means, bringing the opening edge on the other side of the annular tread into contact with the base tire, supplying air into a space surrounded by the base tire, the annular tread, and the sealing means, and placing the annular tread, with air having been supplied into the space, on a predetermined position of the outer periphery of the base tire.

According to this aspect, the opening on one side of the annular tread held by the holding means is sealed by the sealing means, the annular tread in the sealed state is moved, and the opening edge on the other side of the annular tread is brought into contact with a side surface of the base tire. As a result, a closed space is formed by the surface of the drum, the side surface of the base tire, the inner peripheral surface of the annular tread, and the sealing unit. And with air supplied into the closed space by the air supplying means, the pressure inside the closed space is raised to bring the opening on one side of the annular tread into close contact with the sealing unit and move the opening edge on the other side thereof from radially inside to radially outside along the base tire. In this manner, the opening edge can be radially expanded.

Further, as air flows out between the opening edge and the surface of the base tire, an air layer of the air flowing out is formed between the surface of the base tire and the annular tread. And this air layer plays the role of a lubricant for the movement of the annular tread along the surface of the base tire. Hence, the annular tread can be moved smoothly to a predetermined position relative to the base tire without any contact between the surface of the base tire and the inner peripheral surface of the annular tread. Also, the annular tread can be placed on the outer peripheral surface of the base tire by stopping the supply of air, thereby eliminating the air layer from between the annular tread and the base tire.

BRIEF DESCRIPTION OF THE DRAWINGS

FIG. 3 is partially enlarged views of the front and the side of a holding means and an elevational view of a holding surface of a curved plate in accordance with the present invention.

FIG. 4 is an elevational view and side views of a sealing unit in accordance with the present invention.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

Hereinbelow, a tire manufacturing apparatus 1 according to the present invention will be explained.

Figure 1A:
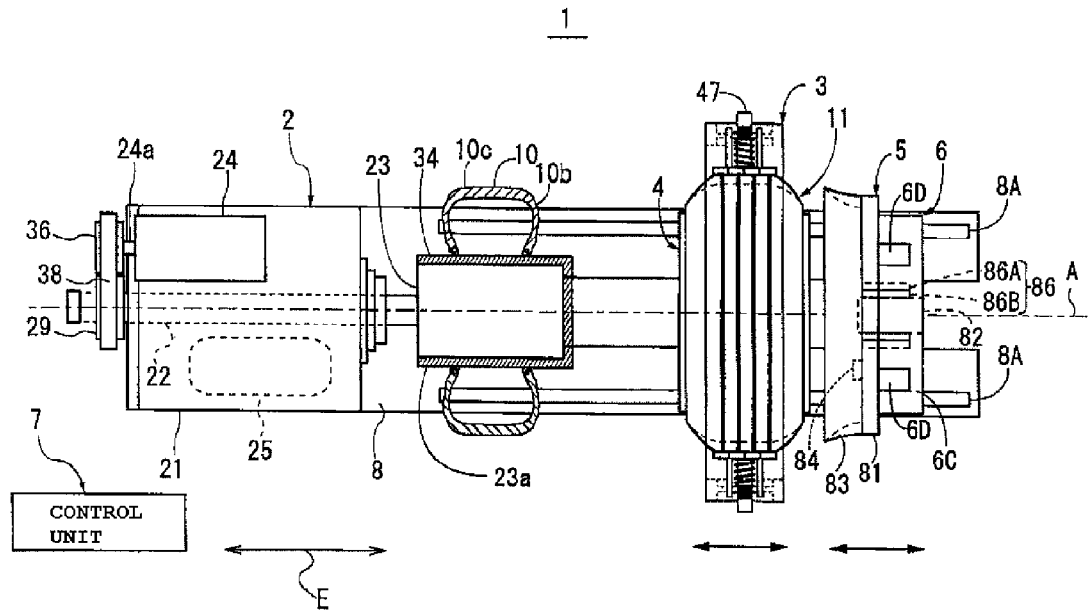
FIG. 1 is a plan view and a side view of a tire manufacturing apparatus in accordance with the present invention.
Figure 1B:
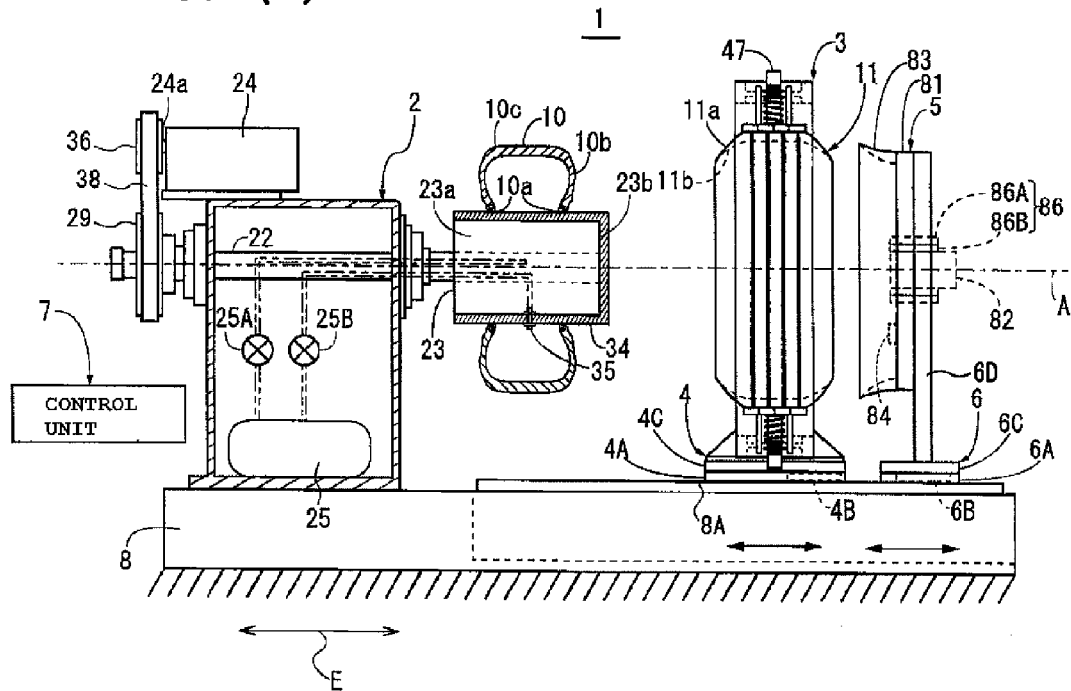

FIG. 1A is a plan view of the tire manufacturing apparatus 1, and FIG. 1B a side view of the tire manufacturing apparatus 1.

As shown in FIGS. 1A and 1B, the tire manufacturing apparatus 1 is roughly comprised of a base tire holding unit 2 for securing a base tire 10, a tread holding unit 3 as a tread holding means to hold an annular tread (hereinafter referred to simply as "tread") 11 expandably and contractably, a first moving mechanism 4 as a moving means to move the tread holding unit 3 closer to or away from the base tire holding unit 2, a sealing unit 5 as a sealing means to seal the opening, on the side opposite from the drum side, of the tread 11 held by the tread holding unit 3, a second moving mechanism 6 for moving the sealing unit 5 closer to or away from the opening, a control unit 7 for controlling the above units operative to mount the tread 11 on the base tire 10.

These units are mounted on a base 8 formed with a horizontal mounting surface. Hereinbelow, these units will be described in order.

The base tire holding unit 2 includes a unit body 21, a drum shaft 22 penetrating the unit body 21 horizontally, a drum 23 attached to one end of the drum shaft 22, a drum motor 24 for rotating the drum shaft 22, and a compressor 25.

The unit body 21 is installed upright on one side of the base 8 and has the drum shaft 22 penetrating through the interior in a longitudinal direction E. The drum shaft 22 is rotatably supported by not-shown bearings secured to the unit body 21. The drum 23 is attached to one end of the drum shaft 22, and a pulley 29 as a rotation transfer mechanism is attached to the other end thereof.

The drum 23, which is a cylindrically-formed wheel, is made up of a plurality of drum pieces that are the radially divided pieces of the wheel, each piece having a fan-shaped section. It is provided with a not-shown expansion mechanism capable of expanding and contracting the diameter of the drum 23 by moving the drum pieces radially and a seal covering 34 so disposed to wrap up the surfaces of the drum 23.

The expansion mechanism for the drum 23 may be a mechanism with air cylinders, one for each drum piece, which move the drum pieces radially by the charge and discharge of air, for instance. More specifically, each of the air cylinders is connected by piping to the compressor 25, and a control valve 25A, which is electrically coupled to the control unit 7, to be discussed later, is provided midway in the piping. And the control valve 25A is opened or closed by an air charge signal or an air discharge signal outputted from the control unit 7, thereby changing the pressure inside the air cylinder. Thus the drum 23 is expanded or contracted with the extension or contraction of the piston in the air cylinder.

The seal covering 34 is a constituent member of rubber or like material cast into a bottomed cylinder shape. The cylindrical part of the seal covering 34 covers the whole area of the outer peripheral surface 23a of the drum 23, whereas the bottom thereof covers the end face 23b of the drum 23 on the side of the tread holding unit 3. In other words, the outer peripheral surface 23a and the end face 23b of the drum 23 are sealed by the seal covering 34.

The seal covering 34 has a valve 35 penetrating the cylindrical part thereof in the thickness direction. One end of the valve 35 protruding on the drum side is connected by piping to the compressor 25 via a charge/discharge valve 25B.

The drum pieces constituting the drum 23, covered with the seal covering 34, will create gaps between the adjacent pieces as they are moved radially outward with the radial expansion of the drum 23. The gaps, however, remain covered by the cylindrical part of the seal covering 34 which stretches circumferentially, while the seal covering 34 is in close contact with the bead portion, or the inner periphery 10a, of the base tire. That is, the internal space of the base tire 10 becomes a sealed space as it is sealed by the cylindrical part of the seal covering 34. Then, with air supplied into the base tire 10 through the valve 35, the base tire 10 is unrotatably held onto the drum 23 while retaining its internal pressure.

Also, the drum 23 is provided with a not-shown automatic aligning mechanism that aligns the axial center of the base tire 10 to be held with the axial center of the drum 23. This function, therefore, always aligns the axial center of the drum 23 with the axial center of the base tire 10 even when the base tire 10 of a different size is held on the drum 23.

The drum motor 24 is secured to an upper part of the unit body 21. The drum motor 24 may be constituted by a geared motor housing a not-shown speed reduction mechanism therewithin, and the rotative force of the motor is outputted to a rotation output shaft 24a in a decelerated state. A pulley 36 is attached to the rotation output shaft 24a. A belt 38 is set riding on the pulley 36 and the pulley 29, and the rotation of the drum motor 24 is communicated to the drum shaft 22, thereby rotating the drum 23. The drum motor 24, which is coupled to the control unit 7, rotates in response to a rotation signal outputted by the control unit 7.

Figure 2:
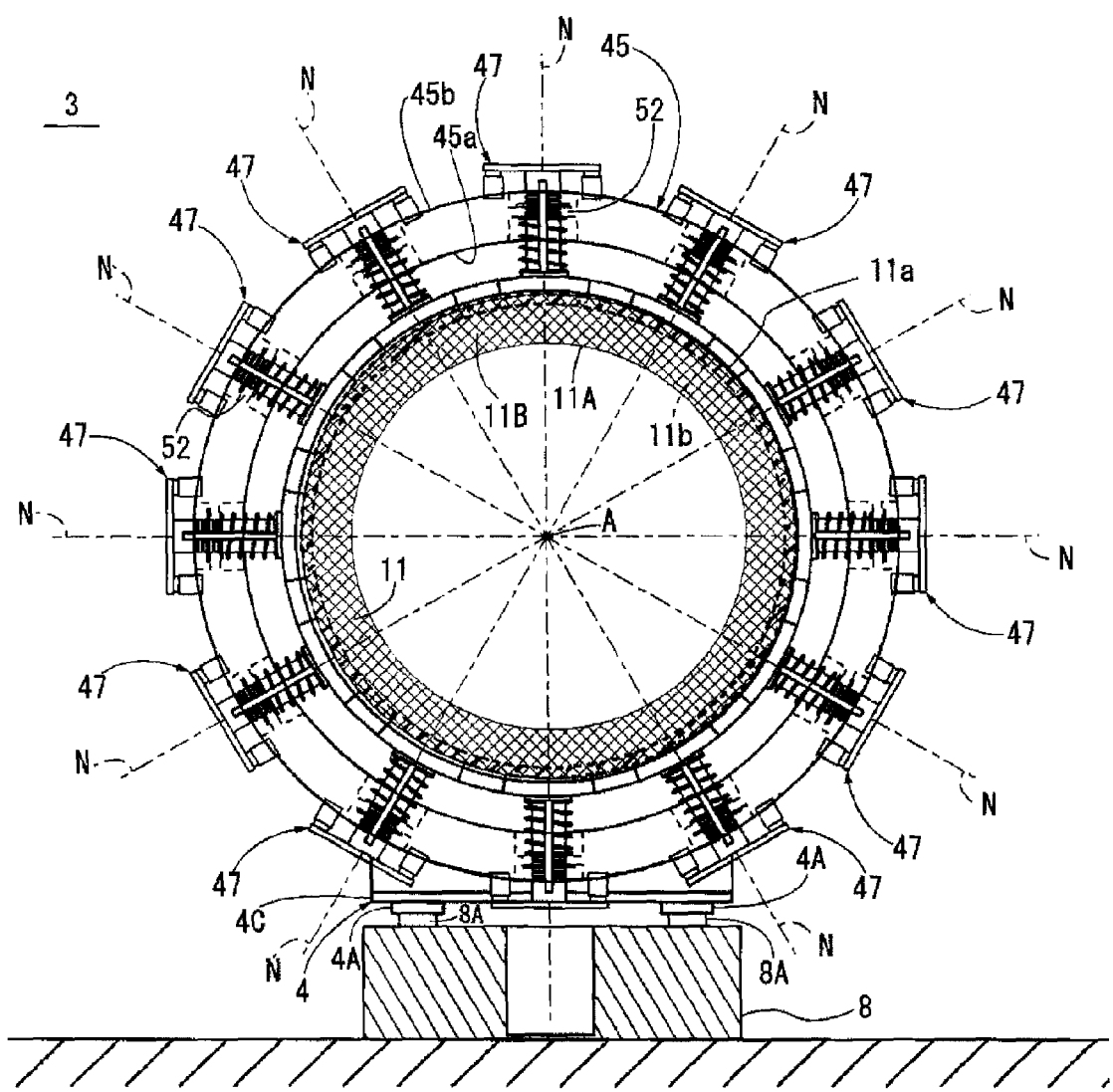
FIG. 2 is an elevational view of a tread holding unit in accordance with the present invention.

FIG. 2 is an elevational view of a tread holding unit 3.

FIGS. 3A and 3B are partially enlarged views of the front and the side of a holding means 47 attached to an annular frame 45, respectively. FIG. 3C is an elevational view of a holding surface 61a of a curved plate 61. Hereinbelow, the tread holding unit 3 is explained with reference to FIG. 2 and FIG. 3.

The tread holding unit 3, which is disposed on the first moving mechanism 4, consists roughly of an annular frame 45 and a plurality of holding means 47.

The first moving mechanism 4 is comprised of sliders 4A, 4A that move along a pair of linear rails 8A, 8A laid on the side of the base 8 opposite to the drum 23 in parallel with the central axis A of the drum shaft 22, servo motors 4B, 4B built in the sliders 4A, 4A to drive them movably, and a seat 4C suspended on the sliders 4A, 4A (see FIG. 1).

The servo motors 4B, 4B, which are coupled to the control unit 7, cause the seat 4C, together with the sliders 4A, 4A, to move closer to or away from the drum 23, following an engage signal or a disengage signal outputted form the control unit 7.

The annular frame 45, which is a metallic cylinder having a diameter larger than a tread 11 to be mounted, is secured onto the seat 4C in such a manner that the center of the annular frame 45 is coaxial with the central axis A of the drum shaft 22. Formed in the annular frame 45 are a plurality of attaching portions 52 for attaching the plurality of holding means 47.

The attaching portions 52 are thinner-walled portions provided at equal intervals circumferentially in the annular frame 45. The attaching portions 52 are formed by cutting the inner peripheral surface 45a and the outer peripheral surface 45b tangentially around the points where the normal lines N from the center of the annular frame 45 radially extending at equal intervals intersect with the inner peripheral surface 45a and the outer peripheral surface 45b.

Opened in the central part of each attaching portion 52 is a circular attaching hole 52a for attaching a holding means 47 to be described later. Further, formed on either axial side of the attaching portion 52 are guide holes 52b through which guide shafts 88, 88 to be described later penetrate. The guide holes 52b are opened in positions having the attaching hole 52a in between. Thus the centers of the attaching hole 52a and the guide holes 52b are aligned in a straight line along the axial direction of the annular frame 45 in parallel with the axis thereof.

Also, formed on the outer periphery 45b of the annular frame 45 are securing surfaces 46, 46 for securing solenoids 75, 75 to be described later in positions circumferentially having each attaching portion 52 in between.

As shown in FIGS. 3A and 3B, a holding means 47 is comprised of a curved plate 61, a sliding shaft 62, a spring 63, a positioning member 64, a pair of guide shafts 88, 88, and a pair of solenoids 75, 75.

The curved plate 61 is a plate member formed in an arc to fit an outer peripheral surface 11a having a tread pattern formed of the tread 11. The curved plate 61 has a holding surface 61a that will come into contact with the outer peripheral surface 11a of the tread 11 to be mounted on the base tire 10. Also, the curved plate 61, as shown in FIG. 3C, is formed in a circumferentially asymmetric shape when viewed from the holding surface 61a side. That is, one circumferential end thereof is formed with a plurality of protruding portions 67 which protrude in a circumferential direction, and the end portions thereof defined by the protruding portions 67 are formed as a plurality of recessed portions 66 which are recessed in the circumferential direction.

On the other hand, the other circumferential end is formed such that the end portions corresponding to the protruding portions 67 of the one end are formed as recessed portions 66, and the end portions corresponding to the recessed portions thereof as protruding portions 67. Thus one end and the other end of the curved plate 61 are formed as protruding and recessed portions 68 and 69 such that a plurality of curved plates 61 adjacent to each other can be engaged with each other without any gap in between.

The holding surface 61a is a surface curved along the circumference of the tread 11 to be mounted, and the curvature is set for a desired one of the tread 11 when it is unified with the base tire 10.

The surface of the holding surface 61a has a plurality of projections 71a to 71d corresponding to the circumferential grooves formed on the tread 11. The projections 71a to 71d project from the holding surface 61a to the same height and extend continually in the circumferential direction. The projections 71a to 71d, which are so arranged as to meet the circumferential grooves 12a to 12d formed in the outer periphery 11a of the tread 11, will engage with the circumferential grooves 12a to 12d. The surface of the holding surface 61a is coated with a fluorine-based resin so as to reduce the friction between the surface of the holding surface

61*a* and the outer peripheral surface 11*a* of the tread 11 when the tread 11 is expanded or contracted radially.

In the present embodiment, the arrangement is such that all the projections 71*a* to 71*d* are arranged in correspondence to the circumferential grooves 12*a* to 12*d*. However, it should be noted that if projections 71*a* and 71*d* are provided to meet at least the circumferential grooves 12*a* and 12*d*, which are located on each outermost side of the circumferential grooves 12*a* to 12*d*, then the tread 11 can be held reliably without any deviation in the axial direction.

Formed on the back side of the holding surface 61*a* of the curved plate 61 is a securing portion 65 for securing the sliding shaft 62 and the guide shafts 88, 88. The securing portion 65 has a flatly-formed upper surface 65*a*, which will, for instance, be parallel to the horizontal plane of a surface plate if the holding surface 61*a* is placed on it.

The sliding shaft 62 is secured vertically approximately in the center of the upper surface 65*a*, and the guide shafts 88, 88 are secured on each axial side of the sliding shaft 62 on the curved plate 61.

The sliding shaft 62 is a shaft member having a circular periphery slidable along the attaching hole 52*a*, and the lower end of the sliding shaft 62 is secured to the upper surface 65*a* of the curved plate 61. Formed in the middle part of the sliding shaft 62 are a plurality of circumferentially continuous annular grooves 72 arranged in the axial direction thereof.

The positioning member 64, which may, for instance, be a snap ring corresponding to the diameter of an annular groove 72, is fitted in the annular groove 72. That is, with the positioning member 64 fitted in the annular groove 72 closest to the curved plate 61, the ring formed by the holding surfaces 61*a* will be the largest, and, with it fitted in the annular groove 72 farthest from the curved plate 61, the ring formed by the holding surfaces 61*a* will be the smallest.

The spring 63 may be constituted by a coil spring having an inside diameter that allows fitting around the sliding shaft 62.

The guide shafts 88, 88 are each a shaft member having a circular periphery slidable along the guide hole 52*b*. One end of the guide shaft 88 is secured to the upper surface 65*a* of the curved plate 61, and the other end thereof rises up through the guide hole 52*b*.

The solenoids 75, 75 are secured to their respective securing surfaces 46 formed on each circumferential side of the attaching portion 52 such that the extension/retraction direction of the movable shafts thereof are in parallel with the central axis of the sliding shaft 62. The upper surfaces of the movable shafts of the solenoids 75, 75 and the upper surface of the sliding shaft 62 are coupled by a flat linking plate 76. The solenoids 75, 75, which are coupled to the control unit 7, operate in response to an expansion signal outputted from the control unit 7. For example, with an expansion signal inputted to the solenoids 75, 75, the solenoids 75, 75 push up the sliding shaft 62 together with the linking plate 76, thereby expanding the diameter of the cylindrical surface formed by the holding surfaces 61*a* of the plurality of curved plates 61.

The holding means 47 of a structure as described above is attached to the annular frame 45 as follows.

A spring 63 is placed around the sliding shaft 62 of the holding means 47, and as the spring 63 is compressed with an end thereof in contact with the attaching portion 52, the positioning member 64 is fitted in an annular groove 72 in a desired position. Thus each of the holding means 47 is attached to the annular frame 45. Then, the solenoids 75, 75 are secured to the securing surfaces formed on the outer periphery of the annular frame 45, and the drive shafts of the solenoids 75, 75 and the sliding shaft 62 are fixed to each other by the linking plate 76.

As a result, the curved plates 61 for folding the tread 11 are installed on the annular frame 45 such that they are radially expandable and contractable, and they are expanded radially outward by the drive of the solenoids 75.

FIG. 4A is an elevational view of a sealing unit 5. FIGS. 4B and 4C are side views of the sealing unit 5.

The sealing unit 5, which is disposed on the second moving mechanism 6, consists roughly of a sealing plate 81, an air supplying means 82, and a sealing member 83 that comes into contact with the tread 11.

The second moving mechanism 6 includes sliders 6A, 6A moving along the linear rails 8A, 8A, servomotors 6B, 6B for moving the sliders 6A, 6A, a seat 6C suspended on the sliders 6A, 6A, and a pair of frames 6D installed upright on the seat 6C. The servo motors 6B, 6B, which are coupled to the control unit 7, control the movement of the sealing unit 5.

The sealing unit 5 includes a sealing plate 81, an air supplying means 82, a sealing member 83, and a pressure sensor 84.

The sealing plate 81 is a circularly-shaped plate member whose diameter is approximately equal to the outside diameter of the base tire 10 and has a circular hole 85 concentric with the outer periphery thereof. The sealing plate 81 is secured to the frames 6D, 6D such that the center of the sealing plate 81 is aligned with the central axis A of the drum 23.

Secured to the circular hole 85 is the air supplying means 82 equipped with an advance/retract mechanism 86.

The advance/retract means 86 consists of an outer cylinder 86A having an outside diameter equal to the diameter of the circular hole 85 and an inner cylinder 86B which slides axially along the inner periphery of the outer cylinder 86A. The advance/retract means 86 is secured to the circular hole 85 such that the axis line of the cylinders is aligned with the central axis A of the drum 23. The outer cylinder 86A has a motor 86C with a pinion gear built therein, and the inner cylinder 86B has a rack 86D extending axially on the outer periphery thereof. With the pinion gear of the motor 86C and the rack 86D engaged with each other, the inner cylinder 86B advances or retracts in the axial direction relative to the outer cylinder 86A (see FIGS. 4B and 4C). The air supplying means 82 to be used is a device capable of delivering a large amount of air. For example, a cylindrically-shaped blower fan may be used. And the outer periphery of the blower fan is fixed to the inner periphery of the inner cylinder 86B.

The sealing member 83, which is to be made of a flexible material, is preferably an annular rubber member having a wedge-shaped cross section. The sealing member 83 has a pointed edge 83*a* whose diameter is larger than that of a thicker-walled base end 83*b* thereof. That is, the sealing member 83 is formed such that the diameter of the pointed edge 83*a* is larger than the diameter of the open edge 11A of the tread 11 and smaller than the outside diameter of the tread 11. The sealing member 83 has the base end 83*b* thereof fixed to the sealing surface 81*a* of the sealing plate 81 facing the drum 23 along the periphery thereof, so that the pointed edge 83*a* of the sealing member 83 faces the drum 23. A caulking agent or the like is filled between the sealing plate 81 and the sealing member 83 so as to seal the fixed portion. It is to be noted that the rubber material to be selected for the sealing member 83 should be one at least harder than the tread 11. Use of the rubber material of the sealing member 83 harder than the tread 11 can prevent the bending of the sealing member 83 when the tread 11 is pressed against the sealing member 83.

Attached to the sealing surface 81*a* surrounded by the sealing member 83 is a pressure sensor 84 for measuring the air pressure on the sealing member 83 side. The pressure sensor 84, which is coupled to the control unit 7, outputs the pressure reading to the control unit 7.

It should be appreciated that if a flexible material softer than the sealing member 83 and the tread 11, such as silicone for instance, is placed annularly along the inner peripheral side of the pointed edge 83a of the sealing member 83, then the close contact between the outer periphery of the tread 11 and the sealing member 83 will be improved.

The motor 86C of the advance/retract mechanism 86, which is coupled to the control unit 7, moves the air supplying means 82 toward the pointed edge 83a side of the sealing member 83 in response to an advance signal outputted by the control unit 7 and moves it toward the base end 83a side thereof in response to a retract signal. When an advance signal is inputted to the motor 86C, the air supplying means 82 is moved until the air outlet 82a of the air supplying means 82 protrudes beyond the pointed edge 83a. Also, when a retract signal is inputted to the motor 86C, the air supplying means 82 is moved until the air outlet 82a is flush with the sealing surface 81a of the sealing plate 81 where the sealing member 83 is fixed.

With the air supplying means 82 advanced as described above, when, for instance, the sealing member 83 is in contact with the outer peripheral surface 11a of the edge portion 11B of the tread 11, air can be supplied from the air supplying means 82 in a position protruding beyond the pointed edge 83a such that the edge portion 11B of the tread 11 in contact with the sealing member 83 can be pushed up from the inner peripheral side to press on the sealing member 83. Also, with the air supplying means 82 retracted, when the tread 11 is fitted on the base tire 10, the collision of the air supplying means 82 with the drum 23 holding the base tire 10 can be avoided. Note that the edge portion 11B is the part of the tread 11 turning toward the center of the tire without being held by the holding means 47.

Thus, with the second moving mechanism 6 driving, the sealing unit 5 can be brought closer to the tread 11 held by the tread holding unit 3 until the pointed edge 83a of the sealing member 83 comes into contact with the outer peripheral surface 11a of the tread 11 on the sealing unit 5 side which is not held by the holding surface 61a. In this manner, one opening of the tread 11 is sealed, and a space surrounded by the inner peripheral surface 11b of the tread 11, the sealing member 83, and the sealing plate 81 can be formed.

Figure 5:
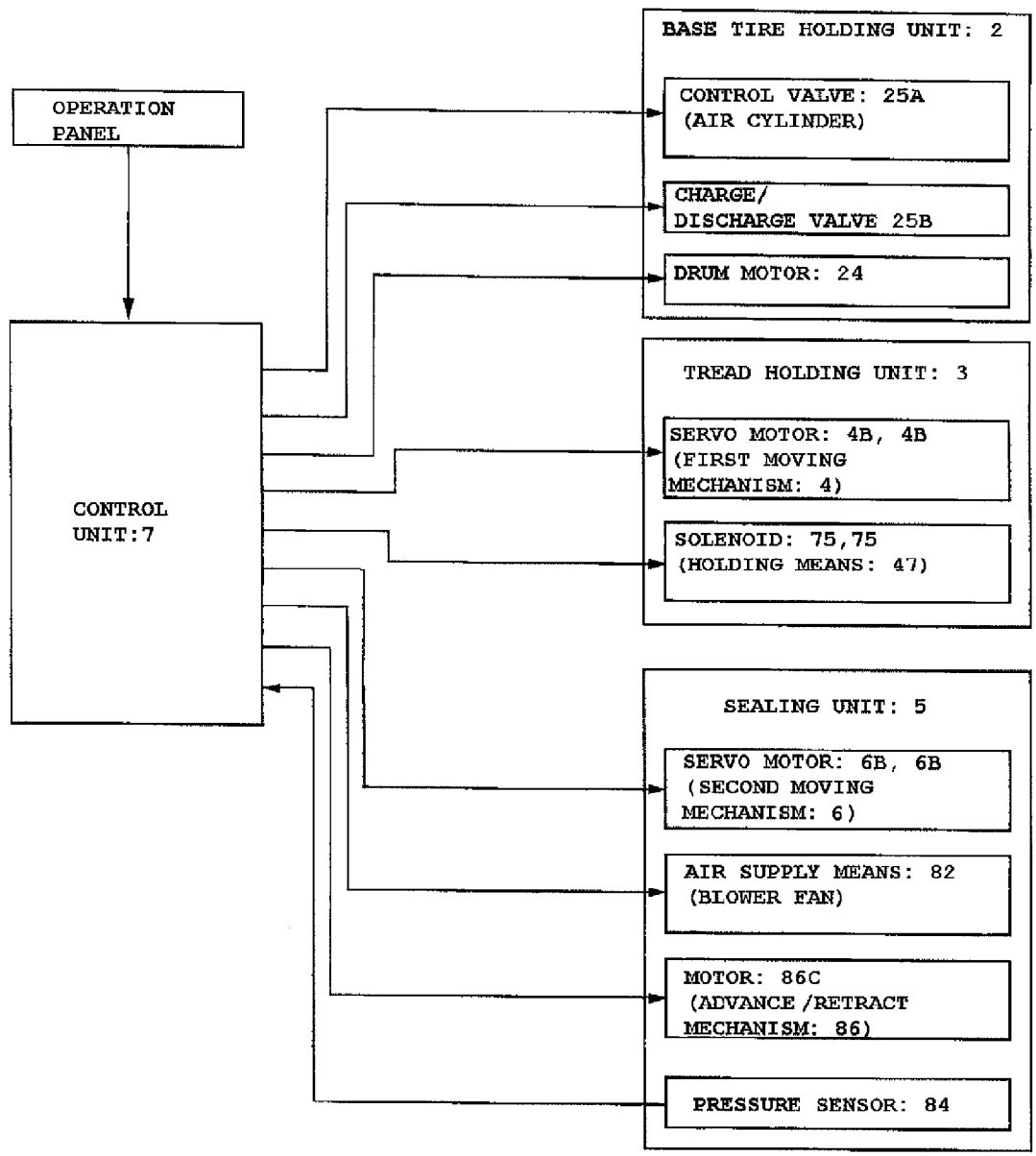
FIG. 5 is a block diagram showing the coupling of a control unit with the constituent units of an apparatus in accordance with the present invention.

FIG. 5 is a block diagram showing the coupling of the control unit 7 with the constituent units of this apparatus.

The control unit 7, which is coupled to the operation panel, the base tire holding unit 2, the tread holding unit 3, and the sealing unit 5, controls the entire operations of mounting a tread 11 on a base tire 10.

The control unit 7 outputs respective signals to the control valve 25A, the charge/discharge valve 25B, and the drum motor 24 of the base tire holding unit 2. Outputted to the control valve 25A are an expansion signal for expanding the diameter of the drum by charging air supplied from the compressor into the air cylinders and a contraction signal for contracting the diameter of the drum by discharging air from the air cylinders. Outputted to the charge/discharge valve 25B are an air charge signal for charging air supplied from the compressor into the base tire and an air discharge signal for discharging air out of the base tire. Outputted to the drum motor 24 are rotation control signals for controlling the start and the stop of drum rotation.

Also, the control unit 7 outputs signals to the servo motors 4B, 4B and the solenoids 75, 75 of the tread holding unit 3.

Outputted to the servo motors 4B, 4B, in response to pressure signals outputted by the pressure sensor 84 to be discussed later, are an engage signal for bringing the tread holding unit 3, together with the tread 11, closer to the base tire 10, a stop signal for stopping the engaging motion, and a disengage signal for returning the tread holding unit 3 back to the initial position when the mounting of the tread 11 on the base tire 10 is completed.

Outputted to the solenoids 75, 75 is a release signal for releasing the tread 11 from the holding surface 61a when the tread 11 is fitted on the outer peripheral surface 10c of the base tire 10.

Also, the control unit 7 outputs signals to the servo motors 6B, 6B, the air supplying means 82, and the motor 86C of the sealing unit 5 and receives pressure signals outputted by the pressure sensor 84.

Outputted to the servo motors 6B, 6B are a sealing signal for moving the sealing unit 5 to accomplish a sealing with the sealing member 83 in contact with the outer peripheral surface 11a of the tread 11, a tracking signal for tracking the movement of the tread holding unit 3, a stop signal for stopping the tracking, and a home return signal for moving the sealing unit 5 back to the initial position when the fitting of the tread 11 on the base tire 10 is completed.

Outputted to the air supplying means 82 is an air supply signal for supplying a low-pressure air into the region surrounded by the sealing plate 81, the sealing member 83, and the inner peripheral surface 11b of the tread 11 when the sealing member 83 is in contact with the outer peripheral surface 11a of the tread 11.

Outputted to the motor 86C are an advance signal for advancing the air supplying means 82 toward the tread 11 side when the sealing member 83 comes into contact with the outer peripheral surface 11a of one edge portion 11B of the tread 11 and a retract signal for retracting the air supplying means 82 in response to a pressure signal outputted by the pressure sensor 84 to be discussed later to the control unit 7.

The pressure sensor 84 measures the pressure in the region surrounded by the sealing plate 81, the sealing member 83, and the inner peripheral surface 11b of the tread 11 when the sealing member 83 is in contact with the outer peripheral surface 11a of the tread 11 and outputs the reading to the control unit 7.

The pressure signals outputted by the pressure sensor 84 may include certain characteristic pressure signals as follows. For example, the tread holding unit 3 and the sealing unit 5 are moved toward the base tire holding unit 2 while the state of one of the openings sealed is maintained with the sealing member 83 in contact with the outer peripheral surface 11a of the tread 11. And when the other opening edge 11A of the tread 11 comes into contact with a side surface 10b of the base tire 10, a transient pressure rise signal may be outputted as air is supplied by the air supplying means 82 into the momentarily perfect closed space formed by the seal covering 34 of the drum 23, the side surface 10b of the base tire 10, the inner peripheral surface 11b of the tread 11, the sealing member 83, and the sealing plate 81. Also, as the above-mentioned pressure rises, the diameter of the other opening edge 11A is gradually expanded along the side surface 10b of the base tire 10. And this diameter expansion creates a gap D between the side surface 10b of the base tire 10 and the opening edge 11A through which air flows out, thereby gradually lowering the pressure to an equilibrium state. In this process, a pressure lowering signal and a pressure equilibrium signal are outputted.

FIGS. 6 through 11 are illustrations showing the processes for mounting an annular tread 11 on a base tire 10 by a tire manufacturing apparatus 1. Hereinbelow, the mounting of an annular tread 11 on a base tire 10 will be described with reference to FIGS. 6 through 11.

First the operator sets a base tire 10 on the periphery of the drum 23. It is to be noted that a cushion rubber or an adhesive glue to ensure the adhesion of the tread 11 is applied on the outer peripheral surface 10c of the base tire 10b in advance. Also note that the tread 11 to be used is one which is cure-molded into a right size when it is mounted on the outer peripheral surface 10c of the base tire 10.

Next, the operator enters the tire size of the base tire 10 and the dimensions of the tread 11 which are to be fitted together from the operation panel. In response to the data inputs, the control unit 7 outputs an expansion signal and an air charge signal to expand the diameter of the drum 23 and pressurize the interior of the base tire 10 so as to hold the base tire 10 on the drum 23 unrotatably.

Then the operator sets the tread 11 on the curved plates 61 of the respective holding means 47, making certain that the projections 71a to 71d on the holding surface 61a of each curved plate 61 of the tread holding unit 3 are in correspondence to the circumferential grooves 12a to 12d formed in the tread 11. More specifically, the operator fits the grooves 12a 12d in the tread 11 on the projections 71 on the holding surface 61a along the circumference until the tread 11 is held by the holding surfaces 61a of all the curved plates 61. That is, the outer peripheral surface 11a of the tread 11 is held by the plurality of holding surfaces 61a which are located radially outside of the tread 11 such that the tread 11 is surrounded for the whole circumference by the plurality of holding surfaces 61a. It should be appreciated that the tread 11 is held while keeping its natural circumference under a biasing force of the springs 63 of the holding means 47.

Next, the operator enters the completion of placement of the base tire 10 and the tread 11 from the operation panel.

Figure 6A:
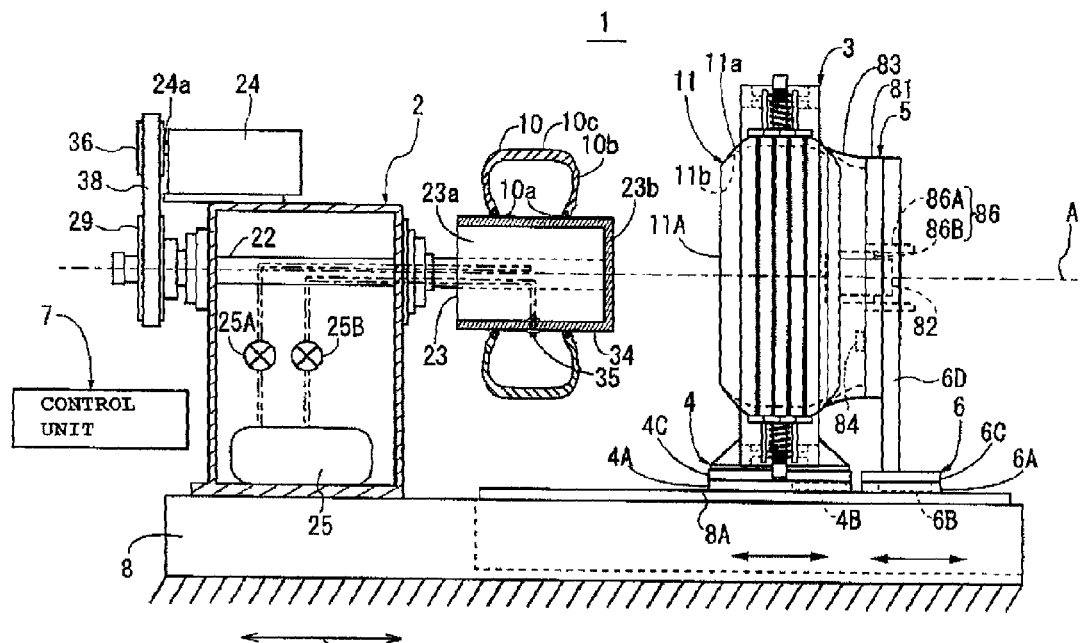
FIG. 6 is a side view and a partially enlarged view showing the operation of a tire manufacturing apparatus and the contact of the sealing member with the tread in accordance with the present invention.
Figure 6B:
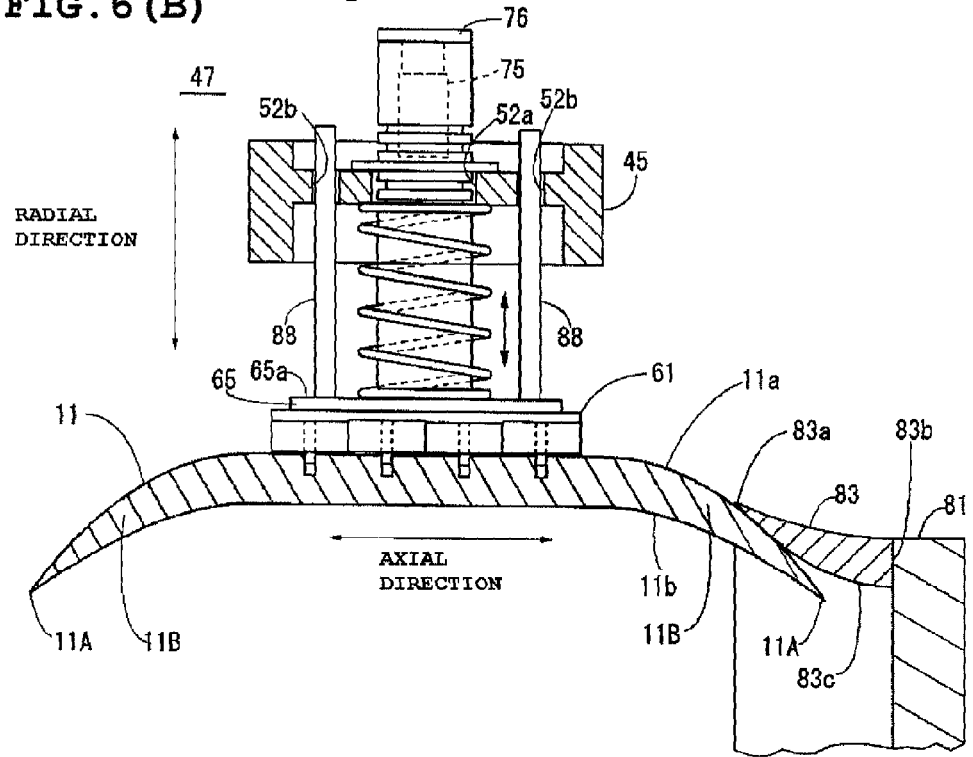

The control unit 7 outputs a sealing signal to the second moving mechanism 6 of the sealing unit 5 to move the sealing unit 5 closer to the opening on one side of the tread 11 so as to seal it until the pointed edge 83a of the sealing member 83 comes into contact with the outer peripheral surface 11a of the tread 11 as shown in FIGS. 6A and 6B. Then the control unit 7 outputs an advance signal to the motor 86c of the advance/retract mechanism 86 provided on the air supplying means 82.

Figure 7A:
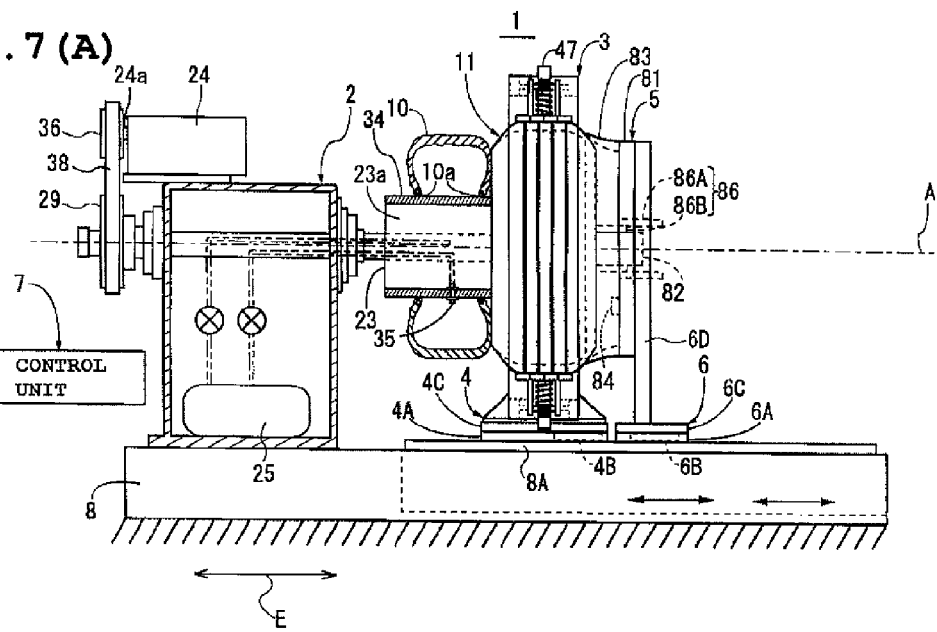
FIG. 7 is a side view and a partially enlarged view showing the operation of a tire manufacturing apparatus and the contact between the sealing member, the tread, and the base tire in accordance with the present invention.
Figure 7B:
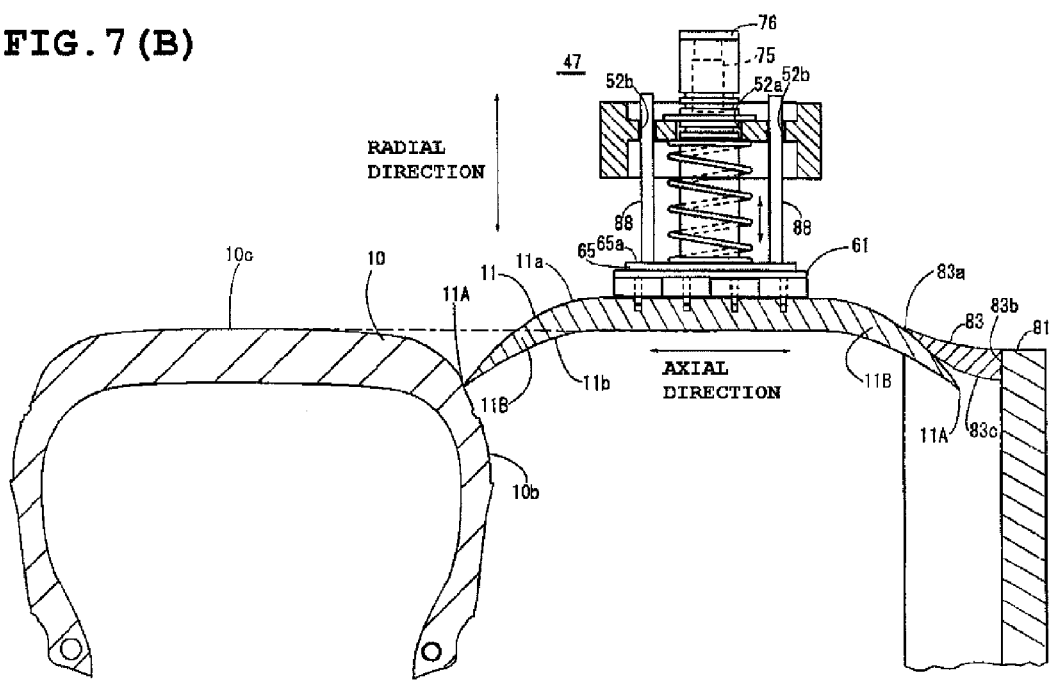

Then the control unit 7 outputs an engage signal to the first moving mechanism 4 and a tracking signal to the second moving mechanism 6 and at the same time outputs an air supply signal to the air supplying means 83. Thus, as shown in FIGS. 7A and 7B, as air is supplied into the space surrounded by the inner peripheral surface 11b of the tread 11, the sealing member 83, and the sealing plate 81 while the state of the opening on one side of the tread 11 sealed is maintained, the tread holding unit 3 and the sealing unit 5 are moved until the other opening edge 11A of the tread 11 comes into contact with the side surface 10b of the base tire 10.

When the other opening edge 11A of the tread 11 comes into contact with the side surface 10b of the base tire 10, the air supplied from the air supplying means 82 creates a closed space surrounded by the side surface 10b of the base tire 10, the seal covering 34 covering the peripheral surface and the end surface of the drum protruding into the tread 11, the inner peripheral surface 11b of the tread 11, the sealing member 83, and the sealing plate 81. And the rise of the pressure in this space is measured by the pressure sensor 84, and the reading is outputted to the control unit 7.

Figure 8:
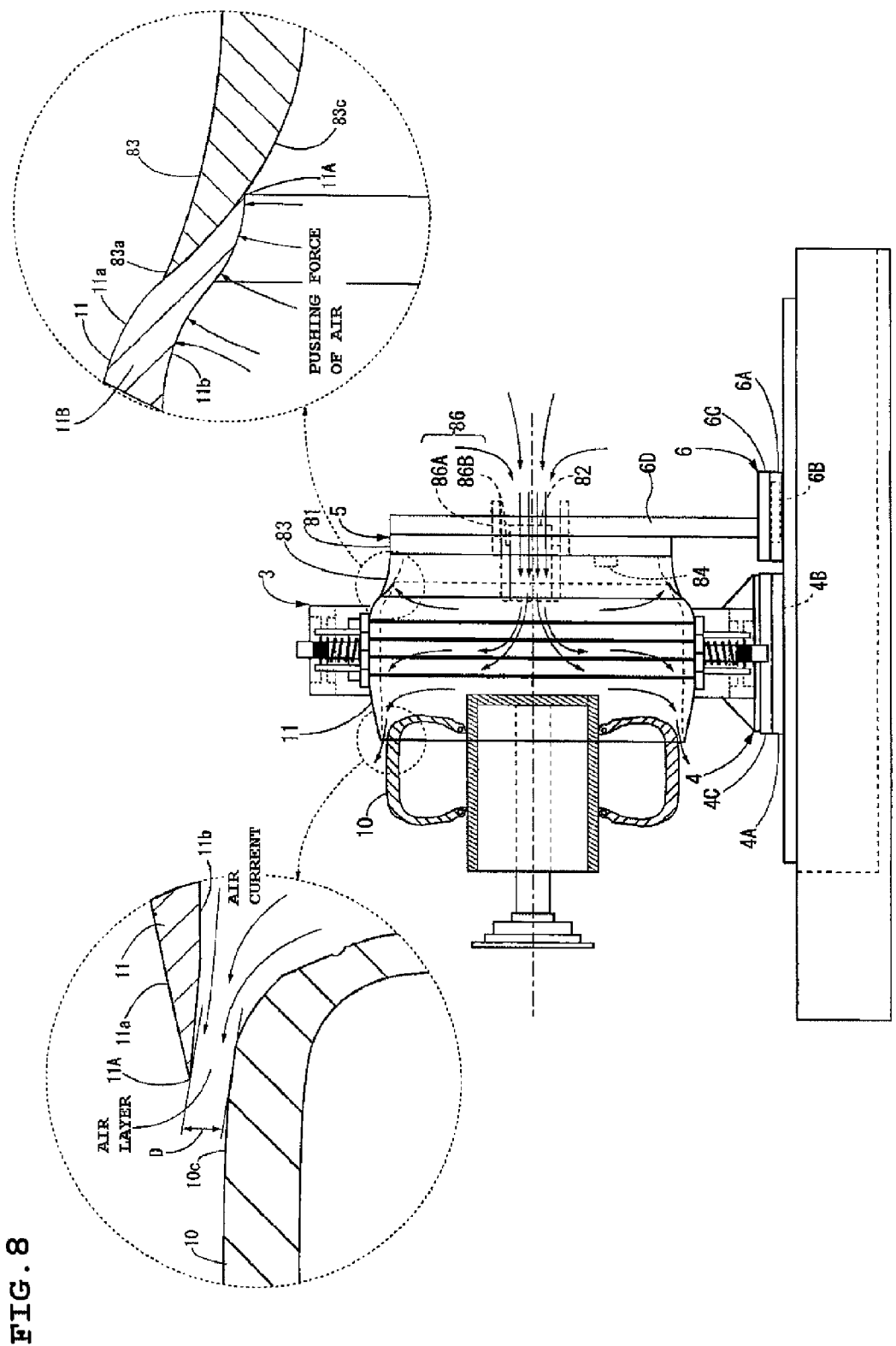
FIG. 8 is illustrations showing an operation of a tire manufacturing apparatus in accordance with the present invention.

Next, the control unit 7 outputs a stop signal to stop the movement of the first moving mechanism 4 and the second moving mechanism 6 and then goes into a standby state until the pressure reading outputted from the pressure sensor 84 reaches an equilibrium. At this time, as shown in FIG. 8, the opening edge 11A of the tread 11 in contact with the side surface 10b of the base tire 10 moves radially outward along the side surface 10b of the base tire 10 in response to the rise of pressure in the above-mentioned space and eventually opens wider than the diameter of the outer peripheral surface 10c of the base tire 10. That is, since the pressure in the space rises, the opening edge 11A of the tread 11 opens wider than the outer peripheral surface 10c of the base tire 10. And after the pressure drops once, a gap D is created between the outer peripheral surface 10c of the base tire 10 and the opening edge 11A of the tread 11. And as air flows out through the gap D, the pressure stabilizes and then reaches an equilibrium.

In other words, while air flows out through the gap D between the side surface 10b of the base tire 10 and the opening edge 11A of the tread 11, the inner peripheral surface 11b of the tread 11 is uniformly pushed radially outward because the amount of air supply into the space by the air supplying means 82 is set larger than the amount of air flowing out through the gap D. More specifically, the edge portion 11B of the tread 11 in contact with the sealing member 83 brings the outer peripheral surface 11a of the tread 11 into close contact with the inner peripheral surface 83c of the sealing member 83. And the crown region of the tread 11 held by the holding means 47 is expanded radially and positioned above the surface of the base tire 10 with the edge portion 11B of the tread 11 positioned above the outer peripheral surface 10c of the base tire 10 separated from the base tire 10 by an air layer. As a result, the tread 11 is radially expanded larger than the outside diameter of the base tire 10.

Figure 9:
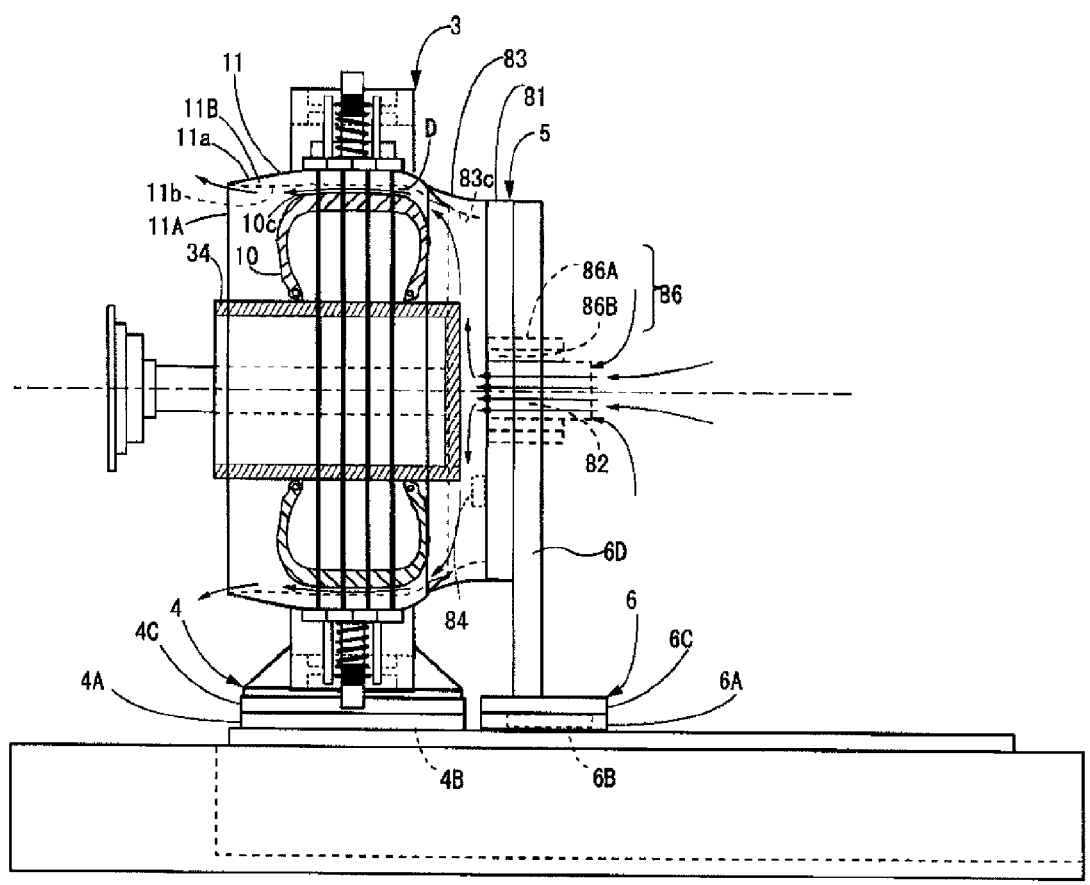
FIG. 9 is illustrations showing an operation of a tire manufacturing apparatus in accordance with the present invention.

Then, when the pressure inside the space as outputted by the pressure sensor 84 has reached an equilibrium, the control unit 7 again outputs an engage signal and a tracking signal to the first moving mechanism 4 and the second moving mechanism 6. This will move these moving mechanisms until the position of the tread 11 relative to the outer peripheral surface 10c of the base tire 10 is such that the axial center of the base tire 10 is aligned with the axial center of the tread 11 as shown in FIG. 9. With an air layer formed between the outer peripheral surface 10c of the base tire 10 and the inner peripheral surface 11b of the tread 11, the tread 11 can be moved without touching the base tire 10. That is, the air layer formed along the outer peripheral surface 10c of the base tire 10 performs the function of a lubricant in the movement of the tread 11.

When the inner peripheral surface 11b of the tread 11 relative to the outer peripheral surface 10c of the base tire 10 reaches a position such that the axial center of the base tire 10 is aligned with the axial center of the tread 11, the control unit 7 outputs a stop signal to the first moving mechanism 4 and the second moving mechanism 6.

Figure 10:
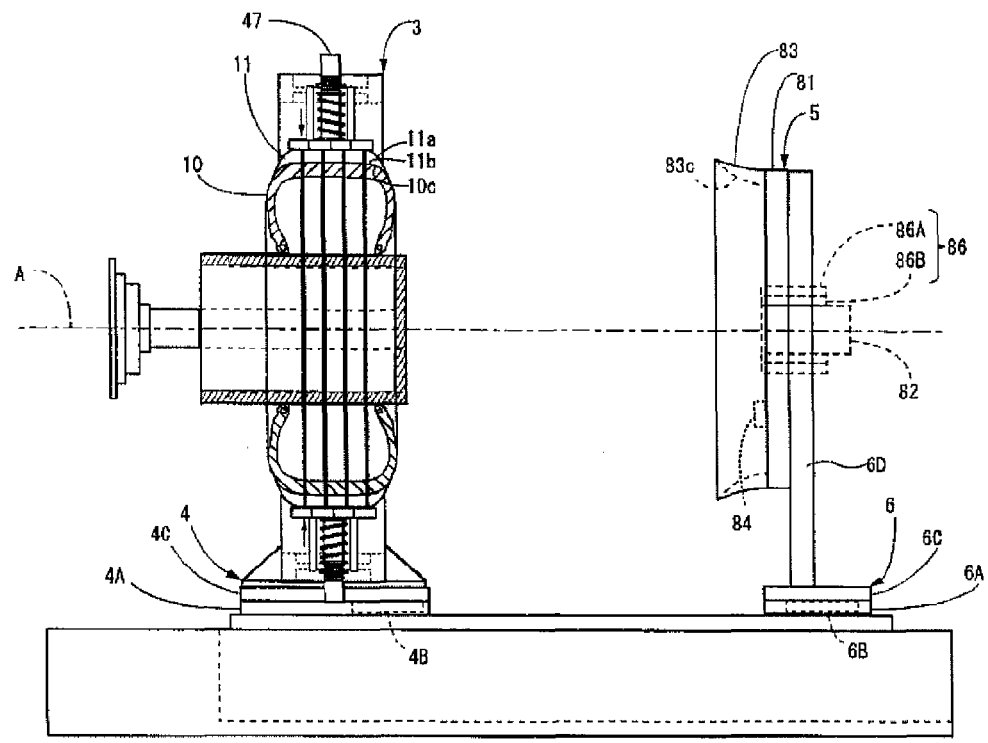
FIG. 10 is illustrations showing an operation of a tire manufacturing apparatus in accordance with the present invention.

Next, as shown in FIG. 10, the control unit 7 outputs an air supply stop signal to the air supplying means 82 to stop the supply of air into the above-mentioned space, thereby eliminating the air layer having been present between the surface of the base tire 10 and the inner peripheral surface 11b of the tread 11. In this manner, the tread 11 can be mounted on the outer peripheral surface 10c of the base tire 10. It should be appreciated that the tread 11 may also be fitted to the base tire 10 by gradually reducing the amount of air supply instead of stopping the air supply into the space.

Upon completion of the mounting procedure, the control unit 7 outputs a home return signal to the second moving mechanism 6 to move the sealing unit 5 to the initial position. On the other hand, the tread holding unit 3 maintains its position where the tread 11 is mounted on the base tire 10. The control unit 7 outputs a rotation signal to the drum motor 24 to rotate the base tire 10 with the tread 11 fitted on. Thus a break-in operation for the surface of the tread 11 is performed as the surface of the tread 11 slides along in contact with the holding surfaces 61*a* which are under a pressing force, or a biasing force, of the springs 63. When the number of revolutions of the drum 23 reaches a predetermined number, a rotation stop signal to stop the rotation of the drum motor 24 is outputted from the control unit 7.

Figure 11:
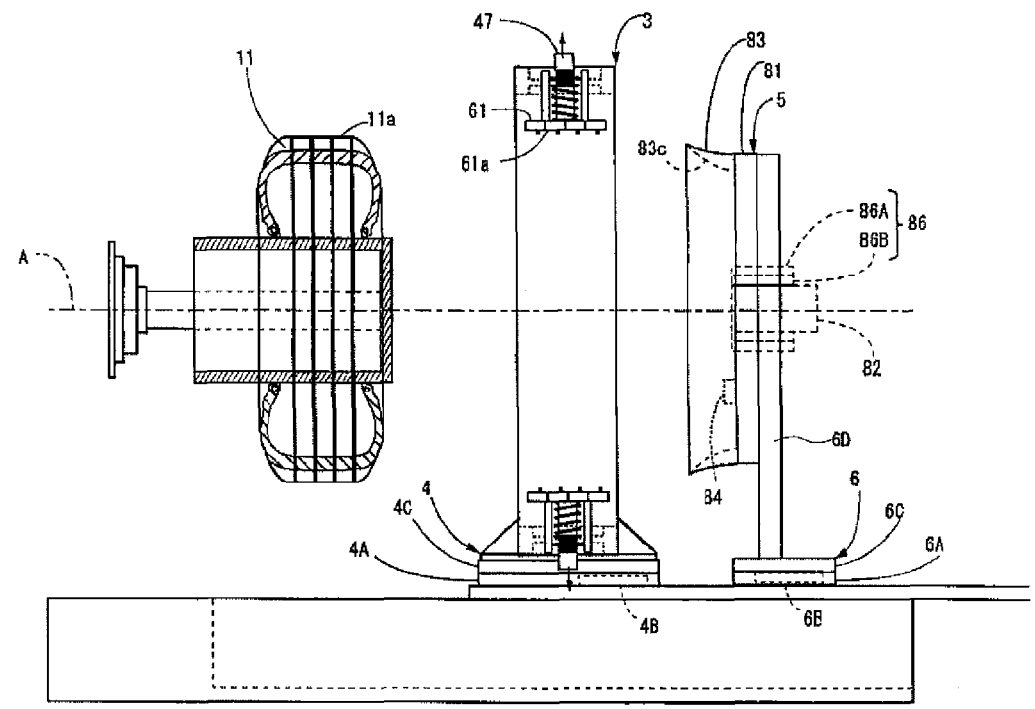
FIG. 11 is illustrations showing an operation of a tire manufacturing apparatus in accordance with the present invention.

Next, as shown in FIG. 11, the control unit 7 outputs a release signal to the solenoids 75, 75 to have the curved plates 61 of the holding means 47 move radially outward. Thus the tread 11 is released with the holding surfaces 61*a* separated from the outer peripheral surface 11*a* of the tread 11. Then the control unit 7 outputs a disengage signal to the first moving mechanism 4 to move the tread holding unit 3 back to the initial position.

Next, the control unit 7 outputs an air discharge signal to the charge/discharge valve 25B and a contraction signal to the control valve 25A to release the internal pressure from the tire, which is now an integrated body of tread 11 and base tire 10. Thus the tire can be dismounted from the drum 23.

Through these processes, a tire of a tread 11 fitted on a base tire 10 can be obtained.

As described hereinabove, the diameter of a tread 11 can be expanded uniformly by the use of the pressure of air for radial expansion of the tread 11. Further, a gap of air layer can be formed between the base tire 10 and the tread 11 by the use of air flowing out therethrough. And using the air layer as a lubricant, the tread 11 can be moved to a predetermined position relative to the base tire 10 such that the axial center of the base tire 10 is aligned with the axial center of the tread 11. Therefore, the tread 11 can be mounted on the base tire 10 without axial waving or deviation.

Also, the pressure of air is used to expand the tread 11 radially, and an air layer is used to have the tread 11 move as if it is sliding over the surface of the base tire 10. This allows the manufacture of a tire with the dimensions of a tread 11, which is cure-molded in advance, even after it is fitted on a base tire 10. Hence, the tread 11 can be manufactured without any loss of extra material. Also, the tread 11 is fitted on the base tire 10 by its own tensile forces. Thus no residual stress results from irregularity of compression or tension in the circumferential direction. Accordingly, a quality tire with excellent durability can be manufactured.

Moreover, the provision of a sealing unit 5 realizes simplification of the structure of the tread holding unit 3 for holding the tread 11.

It has so far been described that the sealing member 83 comes into contact with the outer peripheral surface of the tread 11. But the arrangement may be such that it comes into contact with the inner peripheral surface of the tread 11. In such a case, the sealing member 83 may be made of a rubber material softer than that of the tread 11. Then, when the pressure inside the space rises, the sealing member 83 will be pushed against the inner peripheral surface of the tread 11, thereby accomplishing a close contact between the tread 11 and the sealing unit 5. Thus there will be no air leakage from between the tread 11 and the sealing member 83.

For example, let us assume that a low air pressure of 0.1 MPa (1 kg/cm$^2$) is created inside the above-mentioned space by a blower fan as the air supplying means 82. And if the width of the tread 11 is 400 mm and the diameter thereof 1,000 mm, then it will be possible to have a force of 4,000 kg per unit area work on the inner peripheral surface 11*b* of the tread 11. In the preferred embodiment described above, air flows out through a gap between the outer peripheral surface 11*c* of the base tire 10 and the opening edge 11A of the tread 11. This may reduce the internal pressure obtainable. Yet, let us assume that only a half of the above-cited pressure can be obtained. This still means that the tread 11 can be expanded radially with a force of 2,000 kg working on the inner peripheral surface 11*b* of the tread 11.

In the foregoing specification, the invention has been described with reference to specific embodiments thereof. However, the technical scope of the invention is not limited to the described scope of the embodiments. And it should be evident to those skilled in the art that various modifications and changes may be made thereto without departing from the spirit and scope of the invention.

DESCRIPTION OF REFERENCE NUMERALS

1 tire manufacturing apparatus
2 base tire holding unit
3 tread holding unit
4 first moving mechanism
4A slider
4B servo motor
4C seat
5 sealing unit
6 second moving mechanism
6A slider
6B servo motor
6C seat
6D frame
7 control unit
8 base
8A linear rail
10 base tire
10*a* inner periphery
10*b* side surface
10*c* outer peripheral surface
11 tread
11*a* outer peripheral surface
11*b* inner peripheral surface
11A opening edge
11B edge portion
12*a*-12*d* circumferential groove
21 unit body
22 drum shaft
23 drum
23*a* outer peripheral surface
23*b* end face
24 drum motor
24*a* rotation output shaft
25 compressor
25A control valve
25B charge/discharge valve
29 pulley
34 seal covering
35 valve
36 pulley
37 belt
45 annular frame
45*a* inner peripheral surface
45*b* outer peripheral surface
46 securing surface
47 holding means
52 attaching portion
52*a* attaching hole
52*b* guide hole
61 curved plate
61*a* holding surface
62 sliding shaft 63 spring
64 positioning member
65 securing portion
65a upper surface
66 recessed portion
67 protruding portion
68, 69 protruding and recessed portion
71a-71s projection
72 annular groove
75 solenoid
76 linking plate
81 sealing plate
81a sealing surface
82 air supplying means
83 sealing member
83a pointed edge
83b base end
83c inner peripheral surface
84 pressure sensor
85 circular hole
86 advance/retract mechanism
86A outer cylinder
86B inner cylinder
86C motor
86D rack
88 guide shaft
A central axis
N normal line

The invention claimed is:

1. A tire manufacturing apparatus for mounting an annular tread on the outer periphery of a base tire, the apparatus comprising:
 a drum onto which the base tire is held;
 a holder comprising holding surfaces configured to contact the outer periphery of the annular tread;
 a mover configured to move the holder along a central axis of the base tire;
 a sealer comprising an annular sealing member configured to contact an outer peripheral surface of the annular tread and seal a first opening on one side of the annular tread, wherein a pointed edge of the sealing member is configured to contact the outer peripheral surface of the annular tread on a sealer side thereof; and
 an air supplier configured to supply air into a space surrounded by the annular tread and the sealer, thereby expanding a diameter of a second opening on a side opposite the one side of the annular tread, wherein a gap is formed between the base tire and the annular tread through which air flows out.

2. A tire manufacturing method for mounting an annular tread on the outer periphery of a base tire, comprising:
 placing the outer periphery of the annular tread on a plurality of holders;
 sealing a first opening on one side of the annular tread with a sealer, the sealer comprising an annular sealing member contacting an outer peripheral surface of the annular tread and sealing the first opening on the one side of the annular tread, wherein a pointed edge of the sealing member contacts the outer peripheral surface of the annular tread on a sealer side thereof;
 bringing a second opening edge of the annular tread in contact with the base tire, the second opening opposite the one side;
 supplying air into a space bounded by the base tire, the annular tread, and the sealer, such that a diameter of the second opening is expanded by pushing of air; and
 placing the annular tread, with air having been supplied into the space, on a predetermined position of the outer periphery of the base tire.

* * * * *